(12) United States Patent
Butler

(10) Patent No.: US 8,083,253 B1
(45) Date of Patent: Dec. 27, 2011

(54) SHOPPING CART ASSEMBLY WITH FOLDING LEGS

(76) Inventor: Jill Butler, Havertown, PA (US)

( * ) Notice: Subject to any disclaimer, the term of this patent is extended or adjusted under 35 U.S.C. 154(b) by 391 days.

(21) Appl. No.: 12/326,870

(22) Filed: Dec. 2, 2008

Related U.S. Application Data

(60) Provisional application No. 61/004,924, filed on Dec. 3, 2007.

(51) Int. Cl.
B62B 1/04 (2006.01)
(52) U.S. Cl. ........ 280/651; 141/340; 141/345; 280/641; 280/47.34
(58) Field of Classification Search .................. 280/651, 280/641, 652, 655, 43.1, 640, 47.35, 47.34; 414/340, 345
See application file for complete search history.

(56) References Cited

U.S. PATENT DOCUMENTS

| 4,492,388 A | 1/1985 | de Wit |
| 6,536,796 B1 * | 3/2003 | Solomon ........................ 280/651 |
| 7,080,844 B2 * | 7/2006 | Espejo ..................... 280/33.995 |

* cited by examiner

Primary Examiner — J. Allen Shriver, II
Assistant Examiner — Erez Gurari
(74) Attorney, Agent, or Firm — LaMorte & Associates, P.C.

(57) ABSTRACT

A folding shopping cart assembly having a basket with a bottom surface and side walls. A plurality of rollers are coupled to the basket. A framework is provided for supporting the basket at an elevated height. The basket is capable of moving on rollers relative the framework between a retracted position, where most of the rollers are in contact with the framework, and a cantilevered position, where most of the rollers are not in contact with the framework. Wheels are coupled to the framework so that the framework and the basket can be rolled together as a cart. The framework can be rotated about the basket to a stowed position that enables the cart assembly to be placed in a vehicle.

5 Claims, 5 Drawing Sheets

SHOPPING CART ASSEMBLY WITH FOLDING LEGS

RELATED APPLICATIONS

This application is a continuation-in-part of U.S. Provisional Patent Application No. 61/004,924, entitled SHOPPING CART ASSEMBLY WITH FOLDING LEGS, filed Dec. 3, 2007.

BACKGROUND OF THE INVENTION

1. Field of the Invention

In general, the present invention relates to wheeled carts that have legs that can be folded into a retracted position. More particularly, the present invention relates to wheeled carts that are designed to collapse so that the cart can be placed inside a vehicle without being unloaded.

2. Prior Art Statement

Many people who shop in a supermarket or another large retail store often utilize the shopping carts provided by that store. A shopping cart is typically obtained by a customer as that customer enters a store. The customer shops and places the various products into the cart. The cart is then used to wheel the products to the checkout counter. Once purchased and packaged, the packaged goods are placed back into the shopping cart and are wheeled to the buyer's car. The packaged goods must then be lifted out of the shopping cart and placed into the buyer's car. Finally, the shopping cart must be returned. After the buyer drives the packaged goods home, the buyer must manually carry the packaged goods out of the car.

For a variety of reasons, many people have difficulty lifting packages out of a shopping cart and placing them in an automobile. Such people have even more difficulty lifting the packages out of the automobile and carrying them into the house.

Such people typically rely upon the use of collapsible portable carts. Such carts fold up and collapse into small shapes that can be easily loaded into an automobile. However, such collapsible carts cannot be folded up while still loaded with groceries. Accordingly, a person must unload the packages from the cart at the vehicle, fold and store the cart, drive home, unfold the cart and reload the cart.

In the prior art, shopping carts have been invented that can fold up while still holding packages. Such prior art carts are exemplified by U.S. Pat. No. 4,492,388 to de Wit, entitled Collapsible Cart. In the de Wit patent, a shopping cart is shown with a basket of a fixed shape and collapsible legs. The legs can be collapsed while the basket is full. However, the entire full basket must then be lifted and placed into a vehicle. Any person who has trouble lifting packages would find it nearly impossible to lift a basket filled with multiple packages.

A need exists for a cart that can be used while shopping in a store, wherein the cart can easily pass into a car without being unloaded or lifted. In this manner, a person does not have to load and unload packaged goods. Rather, the packaged goods can remain in the cart before, during, and after a person drives home from a store. This need is met by the present invention as described and claimed below.

SUMMARY OF THE INVENTION

The present invention is a folding shopping cart assembly. The shopping cart assembly has a basket with a bottom surface and side walls. A plurality of rollers are coupled to the basket, wherein said basket is capable of rolling upon those rollers.

A framework is provided for supporting the basket at an elevated height. The basket is capable of moving on the rollers relative the framework between a retracted position, where most of the rollers are in contact with said framework, and a cantilevered position, where most of the rollers are not in contact with the framework.

Wheels are coupled to the framework so that the framework and the basket can be rolled together as a cart.

To use the cart assembly, the cart assembly is rolled to the open bay of a vehicle. The basket is extended into its cantilevered position, wherein the basket is extended into the vehicle. Once the basket is supported by the vehicle, the framework can be rotated up and around the basket. This causes the cart assembly to become compact so that it can be closed inside the vehicle. The cart can be unfolded out of the vehicle by reversing the loading procedure. The cart assembly can therefore be loaded and unloaded from a vehicle without any lifting, while the basket of the cart assembly remains full.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Shopping carts come in a wide variety of shapes and sizes to serve the needs of many types of stores. Likewise, the present invention cart assembly can also be varied into many shapes and sizes. However, for the purposes of simplicity, a single exemplary embodiment of a shopping cart assembly is shown. The illustrated embodiment shows a shopping cart assembly configured for a grocery store and having a standard rectangular basket of about two feet wide by three feet long. The exemplary embodiment should be considered merely a representative form of a shopping cart. Accordingly, the specific dimensions and size proportions illustrated should not be considered limitations when interpreting the claims.

Figure 1:
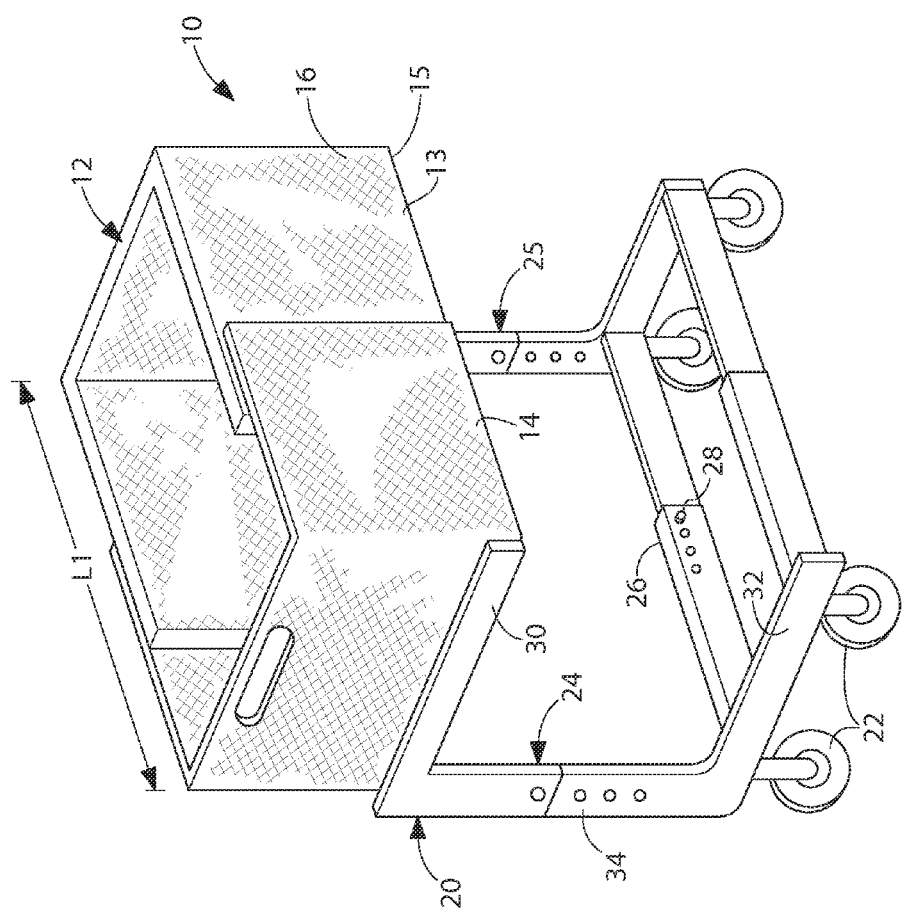
FIG. 1 is a perspective view of an exemplary embodiment of a shopping cart assembly.
Figure 2:
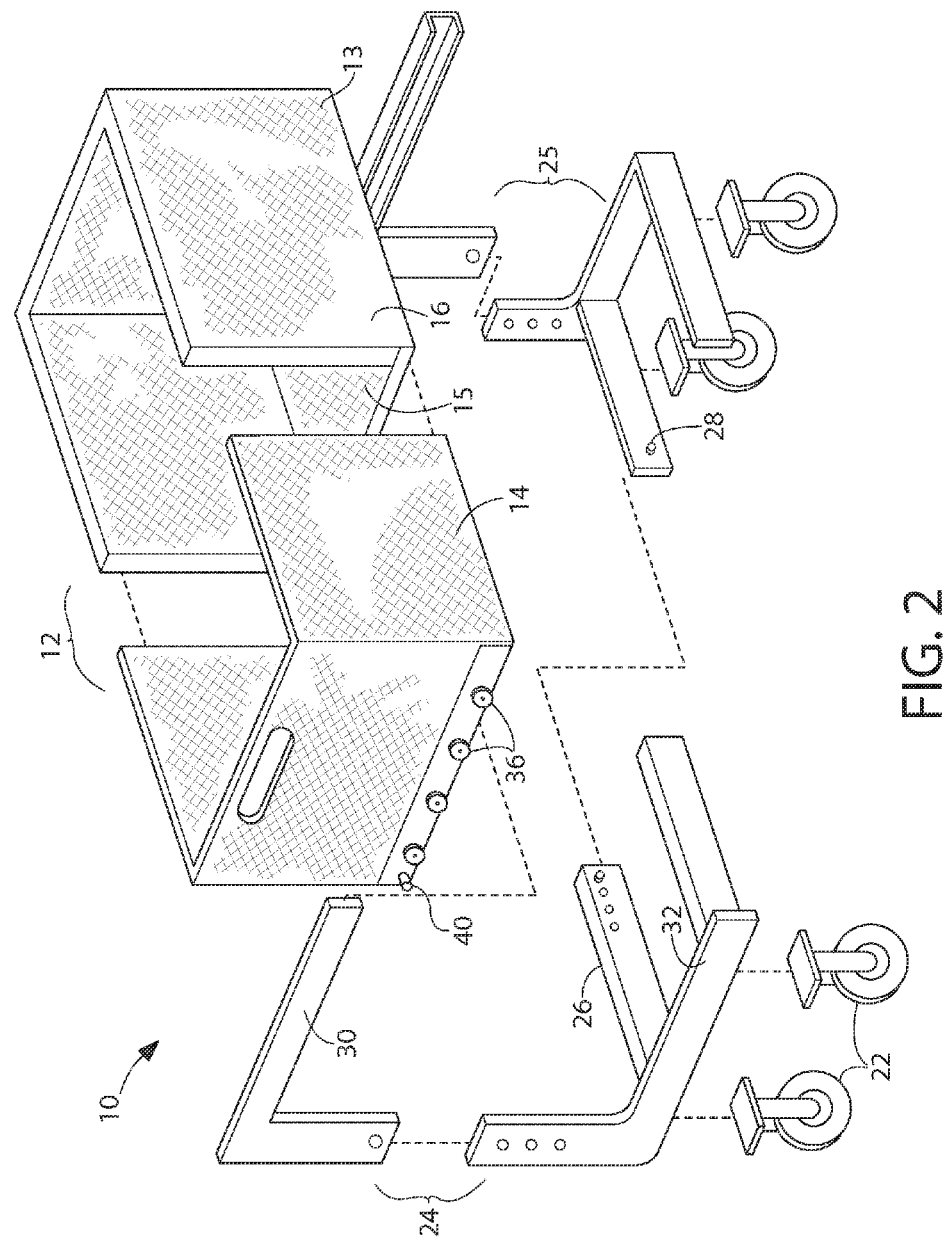
FIG. 2 is an exploded view of the shopping cart assembly shown in FIG. 1.

Referring to FIG. 1 in conjunction with FIG. 2, the exemplary embodiment of a cart assembly 10 is shown. The cart assembly 10 includes a basket 12. Although the basket 12 can have a fixed size, the basket 12 of the exemplary embodiment is adjustable in size. Accordingly, in the exemplary embodiment, the basket 12 is comprised of two or more overlapping sections. In the exemplary embodiment, two sections 13, 14 are shown for the sake of simplicity. Each section 13, 14 is comprised of a lattice base 15 and latticed walls 16 that extend upwardly from three sides of the base 15.

One basket section 13 is slightly smaller than the other basket section 14. The two basket sections 13, 14 overlap, with the smaller basket section 13 passing into the larger basket section 14. This configuration enables the configuration of the overall basket 12 to have a length L1 that can be selectively altered. In the shown embodiment, the basket 12 is adjustable in length, but otherwise rigid. In alternate embodiments, the latticed walls 16 of the basket 12 may be hinged so as to be collapsible when not in use. It should also be understood, that in alternate embodiments, the width W1 of the basket 12 can also be made to be adjustable.

A framework 20 is provided to support the basket 12. The framework 20 is supported by wheels 22. In this manner, the framework 20 and basket 12 can roll and operate in the same manner as a traditional shopping cart. The wheels 22 can be fixed wheels or caster wheels. Furthermore, the wheels can be different sizes. In the exemplary embodiment, wheels of uniform size are illustrated for the sake of simplicity.

The framework 20 has two side sections 24, 25 wherein the basket 12 is interposed between the two side sections 24, 25. Each of the two side sections 24, is preferably adjustable in height. Furthermore, the two side sections 24, 25 are interconnected by a plurality of telescoping supports 26. The telescoping configuration of the supports 26 enables the supports 26 to expand or contract when the basket 12 is enlarged or shortened. At least one locking mechanism 28 is provided on at least one of the telescoping supports 26. The locking mechanism 28 is used to lock the two side sections 24, 25 of the framework 20 at a fixed distance apart. This selectively sets the basket 12 at a fixed length L1.

The two side sections 24, 25 of the framework 20 are generally C-shaped, wherein each has a horizontal top rail 30, a horizontal bottom rail 32 and an adjustable vertical rail 34 that connects the two horizontal rails 30, 32 together.

The basket 12 is interconnected with the horizontal top rails 30 of the two side sections 24, 25 of the framework 20. However, the interconnection is not fixed. Rollers 36 are mounted to the basket 12. The rollers 36 engage tracks formed in or on the horizontal top rails 30. This enables the basket 12 to move relative the framework 20. The basket 12 can move between a fully retracted position and a cantilevered position, as will be further explained.

Figure 3:
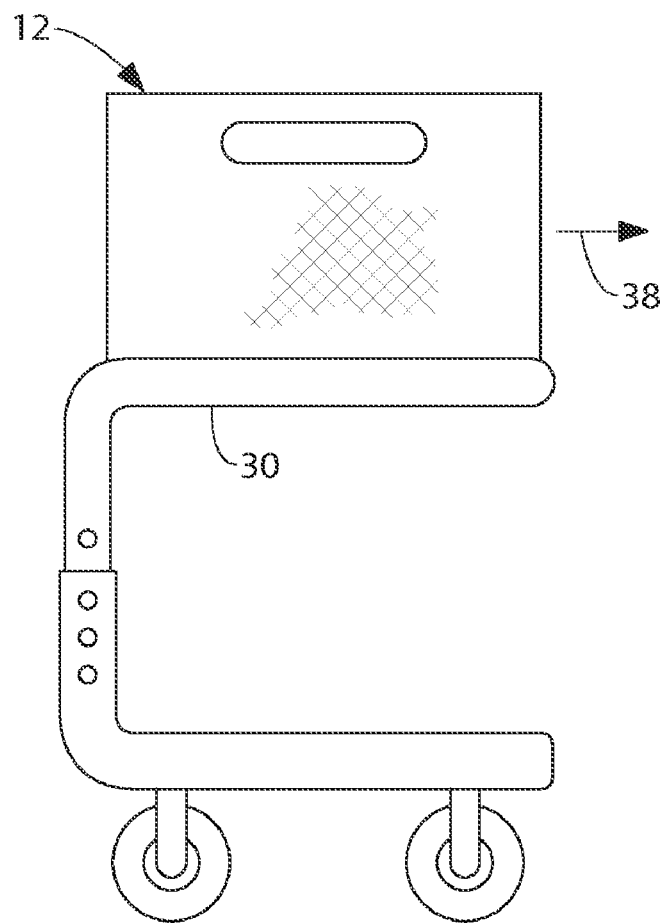
FIG. 3 is a side view of the shopping cart assembly having a basket in a retracted position.
Figure 4:
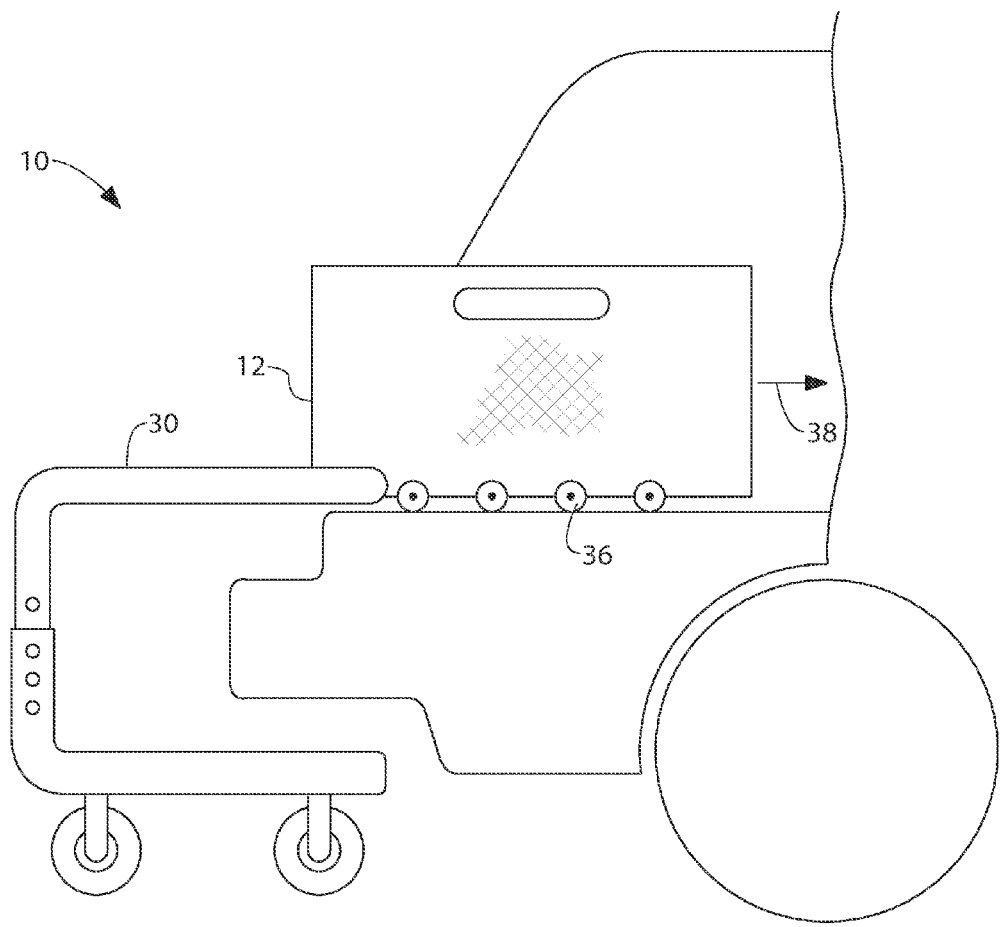
FIG. 4 is a side view of the shopping cart assembly having a basket in a cantilevered position.

Referring to FIG. 3 and FIG. 4, the retracted position and the cantilevered position of the basket 12 are respectively shown. In FIG. 3, it can be seen that when the basket 12 is in its fully retracted position, most, if not all, of the rollers 36 are in direct contact with the horizontal top rails 30. Conversely, in FIG. 4, it can be seen that when the basket 12 is extended into its cantilevered position, the basket 12 extends away from the framework 20 as a cantilever and most of the rollers 36 do not contact the horizontal top rails 30. The rollers 36 on the basket 12 enable the basket 12 to move from a fully retracted position (FIG. 3) to a fully extended cantilevered position (FIG. 4) when the basket 12 is pulled forward in the direction of arrow 38.

When the basket 12 is in its extended cantilevered position, some of the rollers 36 on the sides of the basket 12 are exposed. The exposed rollers can roll onto the bed of a vehicle and help the basket roll into a vehicle. For large baskets 12, it should be understood that one or more rollers (not shown) may be placed under the middle sections of the basket 12 to help support the weight of the basket 12 inside a vehicle.

In FIG. 4, a vehicle with a flat bed is shown. Not all vehicles have flat beds. Rather, some have wells and other uneven structures. A cart assembly can be customized to a specific vehicle type. Collapsible supports can be made to automatically extend from the bottom of the basket to compensate for vehicle with uneven beds. Regardless to the vehicle type, what is important is that the basket 12 can be pushed on rollers into the bed of a vehicle without having to lift the weight of the basket 12.

Two pivot pins 40 (FIG. 2) are provided at opposite bottom corners of the basket 12. The pivot pins 40 engage the top rails 30 of the framework 20 only when the basket 12 is in its extended cantilevered position, such as is shown in FIG. 4.

Figure 5:
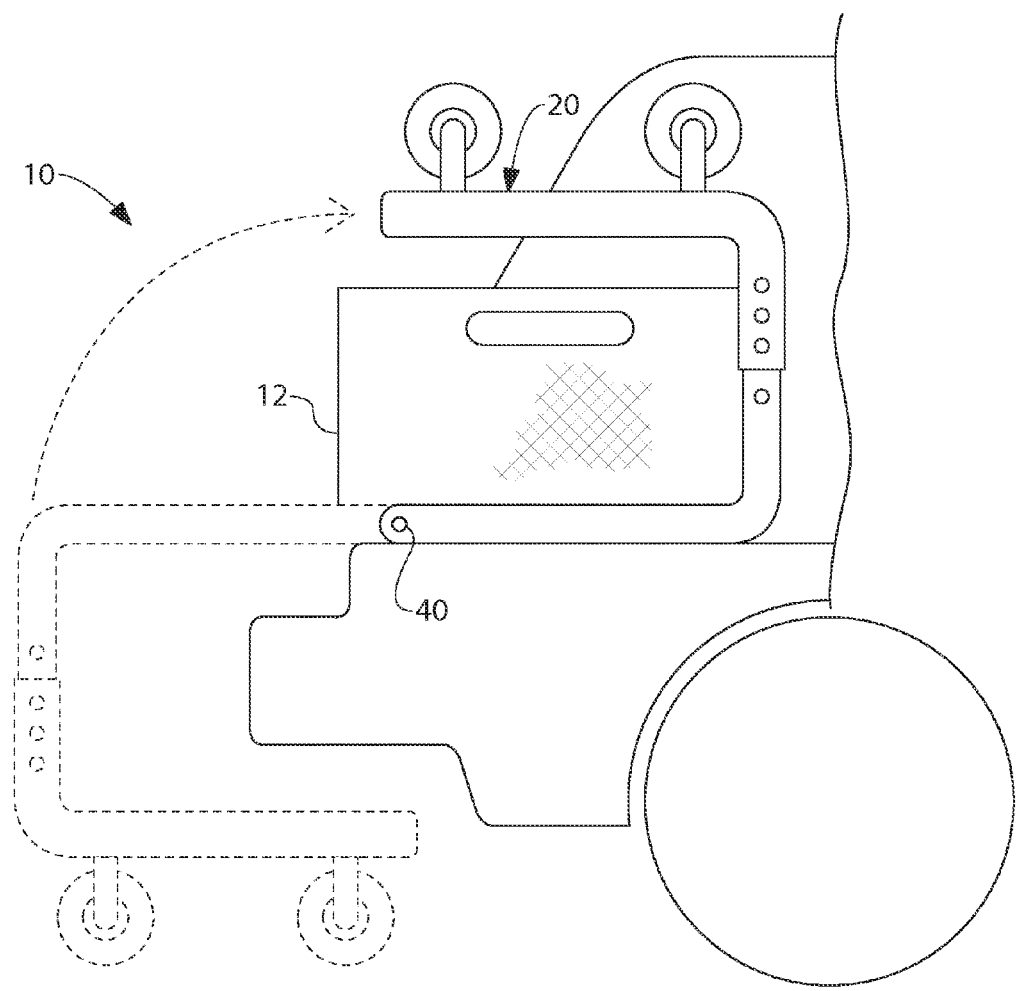
FIG. 5 shows the shopping cart assembly in a folded configuration and loaded into an automobile.

Referring now to FIG. 5 in conjunction with FIG. 2, it will be understood that when the basket 12 is in its cantilevered position, the framework 20 can be rotated about the pivot pins 40. Once rotated, the wheels 22 that once faced downward are inverted so that they now face upward. The side sections 24, 25 of the framework 20 rotate into positions along the sides of the basket 12. The overall cart assembly 10 therefore becomes far more compact without affecting the size of the basket 12 or the contents of the basket 12.

Depending upon the size of the wheels 22 used, the wheels may be removable or foldable to further reduce space. Likewise the side sections 24, 25 of the framework 20 can be made further collapsible to further reduce size.

Referring to FIGS. 2 through 5 in unison, the operation of the cart assembly 10 will now be understood. A person shops in a store using the cart assembly 10 and its basket 12 in its fully retracted position. See FIG. 3. The basket 12 is filled with products to be purchased. After paying for the products, a person walks the cart assembly 10 to his/her vehicle. Preferably the vehicle is a hatchback, SUV, or similar vehicle that has a rear door.

Referring to FIG. 4, it can be seen that the cart assembly 10 is wheeled to the rear of the vehicle. The framework 20 has been previously adjusted in height to match the requirements of the vehicle. The basket 12 is then pulled forward to its cantilevered position. Once the basket 12 is in the cantilevered position, the entire cart assembly 10 is pushed toward the vehicle until the basket 12 enters the vehicle. Once in the vehicle, the rollers 36 on the bottom of the basket 12 rest upon the interior of the vehicle.

Referring to FIG. 5, it can be seen that once the interior of the vehicle supports the full weight of the basket 12, the framework 20 can be rotated up and around the basket 12. The basket 12 and the entire framework 20 are now supported by the basket rollers 36. The folded cart assembly 10 can then be pushed on the rollers 36 further into the interior of the vehicle. The rear door of the vehicle is then closed and the vehicle is ready to be driven.

Once at home, the loading process is reversed. The cart assembly 10 in its folded configuration (FIG. 5) is manipulated into its unfolded configuration (FIG. 4) by rotating the framework 20 back onto the ground. The basket 12 in its cantilever position (FIG. 4) is then moved to its retracted position (FIG. 3). The cart assembly 10 can then be rolled away from the vehicle without ever having to unload the basket 12.

It will be understood that the embodiment of the present invention cart that is illustrated is merely exemplary and that a person skilled in the art can make many variations to the design. For instance, the shape of the basket and shape of the frame can be varied in many ways. All such variations, modifications, and alternate embodiments are intended to be included within the scope of the present invention.

What is claimed is:

1. A folding shopping cart assembly, comprising:
   a basket having a bottom surface with rear corners;
   pivot pins that extend from said basket proximate said rear corners;
   a plurality of rollers attached to said basket proximate said bottom surface, wherein said basket rolls upon said plurality of rollers;
   a framework for supporting said basket at an elevated height when said framework is in an upright position, said framework having two side sections that are interconnected by supports, wherein each side section has a top rail, a bottom rail and a vertical rail that connects said top rail to said bottom rail, and wherein each said top rail defines tracks for receiving said plurality of rollers attached to said basket, wherein said basket moves on said rollers relative said framework between a retracted position, where most of said plurality of rollers are in contact with said tracks and a cantilevered position where most of said rollers extend forward in front of said tracks and not in contact with said framework;

wherein when said basket is in said cantilevered position, said framework can rotate relative said basket out of said upright position into an inverted position; and wheels coupled to said framework, wherein said wheels extend vertically downward for supporting said framework, when said framework is in said upright position and wherein said wheels extend vertically upward when said framework is in said inverted position.

2. The assembly according to claim 1, wherein each vertical rail of said framework is selectively adjustable in height.

3. The assembly according to claim 1, wherein supports of said basket is adjustable in length.

4. The assembly according to claim 3, wherein said supports of said framework are adjustable in length.

5. The assembly according to claim 1, wherein said basket is adjustable in length.

* * * * *